UNITED STATES PATENT OFFICE.

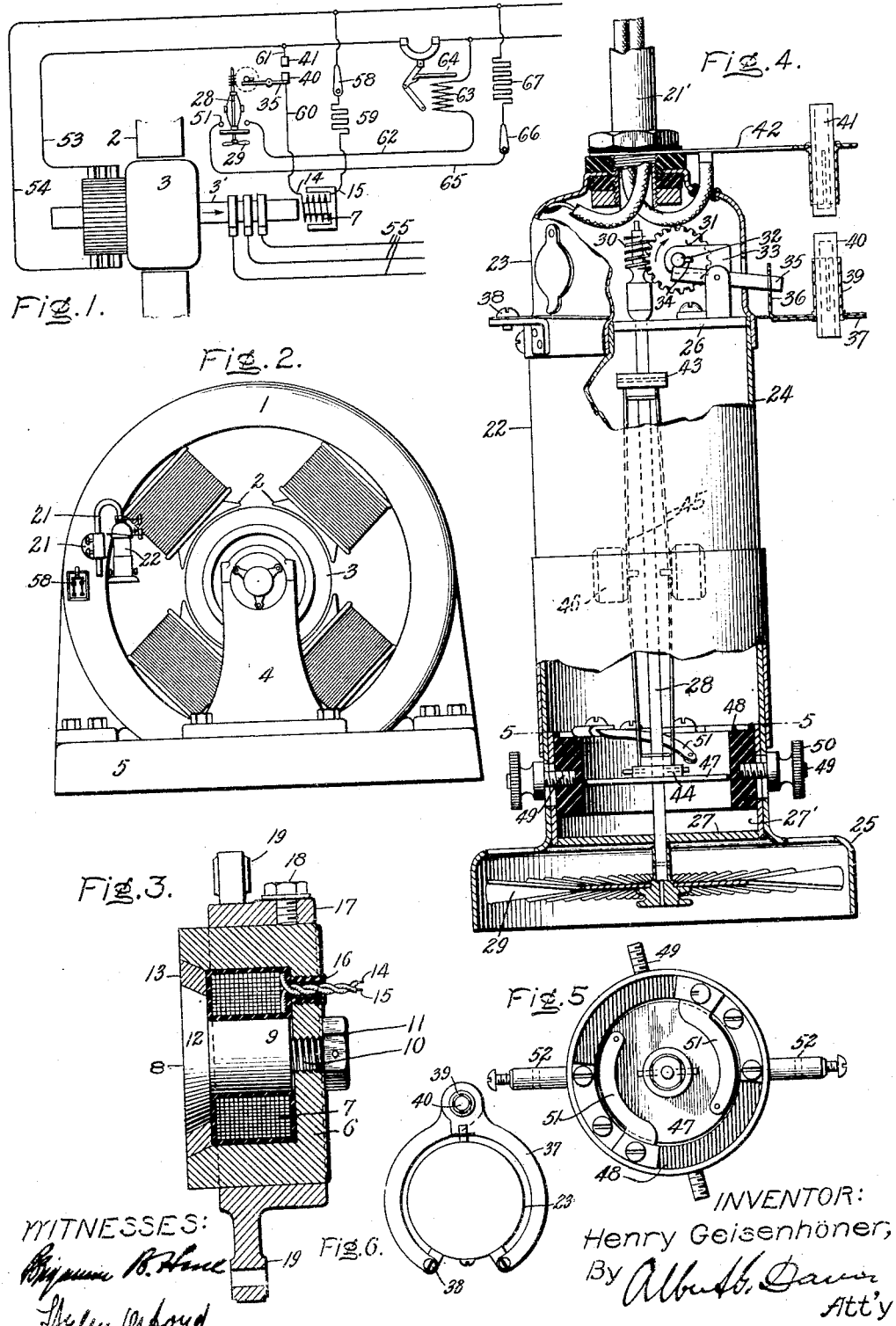

HENRY GEISENHÖNER, OF SCHENECTADY, NEW YORK, ASSIGNOR TO GENERAL ELECTRIC COMPANY, A CORPORATION OF NEW YORK.

SWITCH-CONTROLLING MECHANISM.

No. 853,780.   Specification of Letters Patent.   Patented May 14, 1907.

Application filed February 27, 1906. Serial No. 303,310.

*To all whom it may concern:*

Be it known that I, HENRY GEISENHÖNER, a citizen of the United States, residing at Schenectady, county of Schenectady, State of New York, have invented certain new and useful Improvements in Switch-Controlling Mechanism, of which the following is a specification.

My present invention comprises means for utilizing the air or other fluid set in motion by the movement of the movable elements of a machine to perform certain functions.

In one form in which I have embodied my invention I have provided a device actuated by the windage of the rotating element of a dynamo electric machine to open and close a circuit controlling an electro-magnet employed for periodically moving the shaft of the rotating element longitudinally out of the position in which it is normally held by the magnetic pull between the moving and stationary members of the machine. This motion is desirable in many cases in order to prevent unequal wear of the surfaces of contact between the stationary and rotating parts of the current collecting mechanism. I have also provided an arrangement whereby the windage of the machine is employed to limit the speed of the rotating element.

In the particular form of my invention illustrated, a fan operated by the windage of the machine is employed for not only opening and closing the circuit of the magnetic end play devices used, but also for operating a circuit breaker to open the circuit of the machine proper when the speed of the machine reaches a predetermined maximum.

The various features of novelty which characterize my invention I have pointed out with particularity in the claims annexed to and forming a part of this specification. For a better understanding of my invention, however, and the advantages possessed by it, reference may be had to the accompanying drawings and descriptive matter in which I have illustrated and described one of the forms in which my invention may be embodied.

Of the drawings, Figure 1 is a diagram illustrating the circuit arrangements employed in one form of my invention; Fig. 2 is an end elevation of a dynamo electric machine equipped with my invention; Fig. 3 is a sectional plan of the shaft reciprocating electromagnet; Fig. 4 is an elevation partly broken away and in section of the windage actuated device; Fig. 5 is a sectional plan on the line 5 5 of Fig. 4, and Fig. 6 is a detail view of the member 37.

In the drawings, 1 represents the field ring of a dynamo electric machine which in the form shown is a so-called rotary converter. The field ring has internal poles 2 within which revolves the armature 3. The armature shaft 3' is suitably journaled in pillow blocks 4 carried by a base 5 which also supports the field ring. It will be readily understood by those skilled in the art that the magnetic interaction between the field poles and the armature normally tends to hold the armature in the symmetrical position shown in Fig. 1.

One of the pillow blocks 4 supports an electro-magnet which when suitably energized tends to pull the shaft in the direction indicated by the arrow in Fig. 1. In the construction shown the electromagnet comprises a cup-shaped member 6 of magnetic material in which is placed an annular coil or winding 7. The coil 7 is retained in place by means of a central body 8 of magnetic material. The body 8 is provided with a cylindrical portion 9 which passes through the winding 7 and is provided at one end with a threaded extension 10 which extends through the end wall of the member 6 and is secured in place by a nut 11. The opposite end of the member 8 is provided with an enlargement 12 which bears against the inner end of the winding 7. As shown, the curved surface of the enlargement 12 is conical and the adjacent surface of the member 6 is also conical. Between the member 6 and the member 12 is placed a filler 13 of non-magnetic material, such as brass. The inner and outer curved surfaces of the member 13 are conical so that when the member 8 is pulled home by the nut 11, tight joints are formed between the member 12 and filler 13 and the filler 13 and the member 6. The terminals 14 and 15 of the winding 7 pass out through the outer end wall of the member 6 through a bushing 16. The portions of the terminals 14 and 15 passing through the bushing 16 may be cemented in place in order to make the casing surrounding the winding 7 oil and air tight. The member 6 is adjustably secured in the socket of a member 17 by a set screw 18. Arms 19 forming a part of the member 17 are secured to the pillow block 4. The member 6 may be axially adjusted in the member 17 to vary the axial movement imparted to the shaft 3'.

A bracket 21 secured to the field ring of the machine is provided with a socket in which is adjustably secured one leg of a U-shaped member 21' which may be made of piping. The other leg of the member 21' supports the windage actuating device 22 of the mechanism.

In the form of my invention the frame of the member 22 comprises an upper cap like member 23 which is secured to but insulated from the end of the member 21'. To the lower end of the member 23 is secured a tubular casing member 24 which terminates at its lower end in an enlargement 25 open at the lower end. Diaphragms 26 and 27 mounted within the cap 23 and tubular member 24 respectively, have journaled in them a shaft 28. The lower diaphragm 27 which is about on a level with the upper wall of the enlargement 25 is secured to a stiffening member 27' which in turn is secured to the casing member 24. A fan wheel 29 secured to the lower end of the shaft 28 is located within the enlargement 25.

Above the upper end of the diaphragm 26 the shaft 28 is provided with a worm 30 which meshes with a gear 31 mounted on a shaft 32 journaled in a bracket 33 carried by the diaphragm 26. The shaft 32 is provided with a projection or cam 34 which once in each revolution engages and depresses the inner end of a lever arm 35. The outer end of the lever arm 35 which is pivoted between its ends in the bracket 33, passes through a slotted member 36 secured to a flexible member 37. The member 37 which is bifurcated to partly encircle the casing of the member 22 is secured thereto by the screws 38. The free end of the member 37 is provided with a spring socket 39 in which is adjustably mounted a switch contact member 40 which in the form shown consists of a pencil of copper closed at its upper end but tubular throughout its body portion. When the inner end of the member 35 is depressed, the member 40 engages a contact member 41 similar to and supported in the same manner as the member 40, by a flexible arm 42 having its inner end secured in fixed relation to but preferably insulated from the casing of the member 22.

Between the diaphragms 26 and 27 the shaft 28 is surrounded by a collar 43 rigidly secured to the shaft 28 and a collar 44 free to slide on the shaft. The collars 43 and 44 are connected by flexible members 45 which support weights 46 located mid way between the collars. This construction resembles that of the well known ball governor. To the collar 44 is secured a plate 47 of conducting material. A collar 48 of insulating material encircling the plate 47 is secured to the member 24 so that it may be adjusted longitudinal of the shaft 28. As shown, the securing means comprises the screws 49 passing through slots in the members 27' and 24 and secured to the collar 48, and nuts 50 threaded upon the outer end of the screws 49. From the upper end of the collar 48 extend a pair of spring contact members 51 connected to binding posts 52.

Referring to Fig. 1, 53 and 54 represent the direct current conductors leading from the brushes bearing on the commutator of the machines. 55 represents the conductors leading from the collector rings of the machines. A terminal 15 of the winding 7 is connected to the conductor 54 through a switch 58 and a resistance 59. The terminal 14 of the winding 7 is connected to the contact 40 by a conductor 60. A co-operating contact 41 is connected to the conductor 53 by a conductor 61. A binding post 52 connected to one of the contacts 51 is connected to the conductor 53 by a conductor 62 which includes the windings 63 of an electro-magnetically actuated circuit breaker 64, for opening the conductor 53. The binding post 52 for the other contact 51 is connected to the conductor 54 by a conductor 65 which includes a switch 66 and a resistance 67. In practice the leads from the contacts 40 and 41 pass through the hollow member 21' and the switch 58 is mounted on the field ring.

When the machine is in operation the air currents set in motion by the rotation of the revolving element cause the fan wheel 29 to revolve; thereby rotating the shaft 28 in the direction indicated by the arrows in Fig. 4. The rotation of the shaft 28 rotates the shaft 32 and causes the contacts 41 and 40 to periodically engage and disengage. When the contacts 40 and 41 engage the winding 7 is energized and the shaft is moved in the direction indicated by the arrow in Fig. 1. When immediately thereafter the winding 7 is deënergized by the separation of the contacts 40 and 41 the shaft is moved back toward the position shown in Fig. 1 by the magnetic pull exerted between the armature and the field poles. It will be observed that the arrangement of the pin 32 and lever 35 is such that a quick separation of the contacts 40 and 41 is obtained. As the contacts 40 and 41 are exposed to the windage of the machine the sparking tendency is greatly reduced thereby.

The rotation of the shaft 28 causes the weights 46 to move outward under the action of centrifugal force and thereby raise the plate 47. When the speed of the shaft 28 is such as to move the plate 47 into the position in which it connects the contacts 51 the circuit breaker 64 is operated, thus opening the direct current circuit of the machine. By adjusting the position of the contact 51 which may be done though bolts 49 and nuts 50, the circuit breaker can be arranged to operate at any predetermined speed. This forms an effective and reliable speed limiting device for the machine. The speed of the shaft 28 may be regulated by adjusting the position of the device 22 with respect to the armature either by moving the holder 21 axially or rotatively in the socket in which it is held to move the fan wheel 29 into positions where the windage of the machine produces greater or less action on it.

My invention may be employed for the operation of either the speed limiting device or the end play device without a corresponding use of both such devices. This may be done with the mechanism disclosed by opening one or the other of the switches 58 and 66. It will be readily apparent that the two devices need not be assembled in a single structure as shown.

While the form of my invention disclosed has been found to give excellent results in practice, it will be readily apparent to those skilled in the art that changes may be made in the form of my invention without departing from its spirit, and I do not wish the claims hereinafter made to be limited to the exact construction shown and described more than is made necessary by the state of the art.

What I claim as new and desire to secure by Letters Patent of the United States, is,

1. In a dynamo electric machine, a rotating member, a switch, and means operated by the windage of said member for operating said switch.

2. In a dynamo electric machine, a rotating member, a fan operated by the windage of said rotating member, and means for securing the fan in different positions in proximity to said movable member.

3. In a dynamo electric machine, a field ring having internally projecting poles, an armature turning within said poles, a fan secured to the field ring by means permitting its adjustment toward and away from the armature.

4. In a dynamo electric machine, a field ring having internally projecting polar portions, an armature rotating within said polar portions, a fan, and means for adjusting the fan to vary the motion given to it by the windage of the armature.

5. In combination, a moving member, a switch, and means operated by the windage of said member for operating said switch.

6. In combination, a dynamo electric machine, an end play device therefor, conductors for connecting said machine in circuit, and means operated by the windage of the machine for causing energy to be supplied to said device from said conductors.

7. In combination, a dynamo electric machine comprising an external field ring with internally projecting poles, an armature rotating in proximity to said poles, a device for giving end play to the armature shaft, a fan secured in proximity to the armature and operated by the windage of the latter, a pair of switch contact members controlling the energization of the end play device, and means operated by the fan for periodically causing said contact members to engage and disengage.

8. In combination, a dynamo electric machine comprising a rotating shaft member, a fan operated by the windage of the shaft member, a switch controlling the energization of an end-play device, and means operated by the fan for periodically operating said switch.

9. In a dynamo electric machine, a rotating member, a device actuated by the windage thereof, and a speed limiting switch, and an end-play mechanism operated by said device.

In witness whereof I have hereunto set my hand this 26th day of February, 1906.

HENRY GEISENHÖNER.

Witnesses:
BENJAMIN B. HULL,
HELEN ORFORD.